Sept. 27, 1932.   F. D. CHAPMAN   1,879,085
TREATING GRANULAR EDIBLE COMMODITIES
Filed Oct. 13, 1930
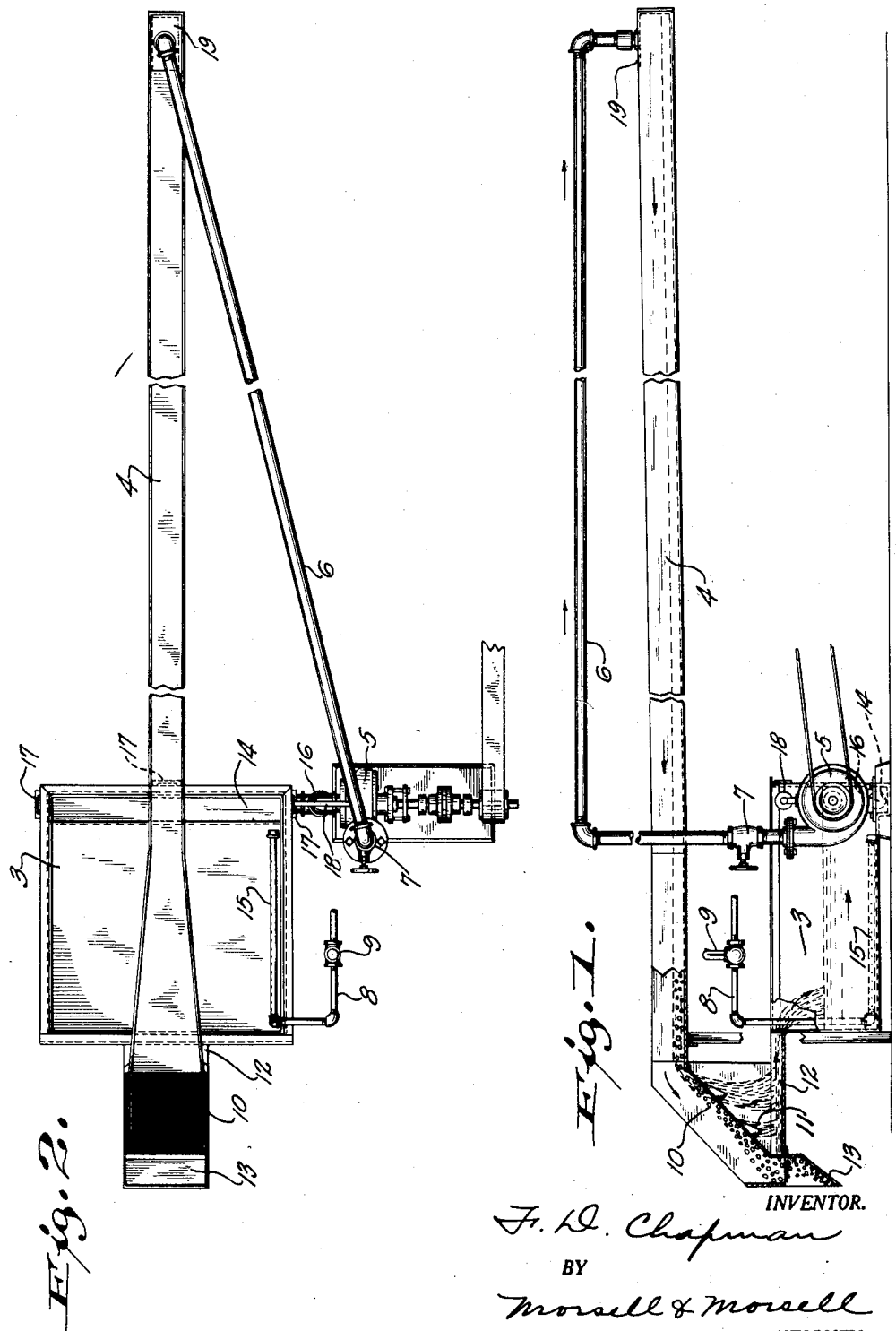
INVENTOR.
F. D. Chapman
BY
Morsell & Morsell
ATTORNEY.

Patented Sept. 27, 1932

1,879,085

UNITED STATES PATENT OFFICE

FRANK D. CHAPMAN, OF BERLIN, WISCONSIN

TREATING GRANULAR EDIBLE COMMODITIES

Application filed October 13, 1930. Serial No. 488,217.

The present invention relates in general to improvements in the art of treating granular edible commodities, and relates more specifically to an improved process of and apparatus for simultaneously transporting and otherwise treating granular materials such as peas, beans, berries or the like, during the preparation of such substances for packing.

A general object of the invention is to provide an improved method of treating granular edible material, and improved apparatus for effecting commercial exploitation of the improved method.

In the canning industry, and especially in the art of packing edible granular materials such as peas, beans, berries or the like, the commodity is ordinarily subjected to various forms of treatment prior to being sealed in the cans or other final containers. During quality grading, for instance, the granular material may be subjected to a separating treatment in brine at relatively low temperature, wherein considerable bacterial activity and growth may result, and it is desirable to check such activity and growth as quickly as possible, and preferably before the commodity is packed in the final containers. This may be accomplished by subjecting the granules to heat, and while such heat treatment may be effected after the commodity has been packed, it is rather difficult at that time to secure complete heat penetration of the sealed batches without undesirably overheating the outer portions of the batches. If the granules are transported from one treating machine to the next, as from the quality grader to the filler, while being exposed to the atmosphere, the undesirable bacterial activity and growth is also augmented, thus necessitating excessive heating in order to subsequently check the same.

It is a more specific object of the present invention to provide an improved method of transporting such commodities as peas, beans, berries or the like, from one place or machine to another in a canning factory, without undesirably exposing the material to the atmosphere, and to simultaneously subject the material to other forms of treatment during such transportation. In accordance with the improvement the granular edible material is hydraulically flumed from one place to another thus washing the granules during the transportation thereof and avoiding exposure to the atmosphere, and the conveying liquid is heated to any desired extent in order to uniformly subject all of the granules to a temperature sufficiently high to effectively stop bacterial activity and growth.

Another specific object of the invention is to provide simple and efficient apparatus for effectively carrying on commercial exploitation of the improved process.

These and other objects and advantages of the present improvement will be more clearly apparent from the following detailed description.

A clear conception of the several steps of the improved process and of one form of apparatus for carrying on the commercial exploitation thereof may be had by referring to the drawing accompanying and forming a part of this specification in which like reference characters designate the same parts in the several views.

Fig. 1 is a partial sectional side elevation of an improved fluming device for hydraulically transporting granular materials from one place to another and for simultaneously heat treating the material; and Fig. 2 is a top view of the apparatus shown in Fig. 1.

While the invention will be specifically described herein in connection with the treatment of peas, it will be apparent that the novel features are capable of more general application. The use of specific terms should not, therefore, be considered as an intentional limitation of the scope of this invention.

Referring to the drawing, the improved fluming apparatus for hydraulically transporting and for simultaneously treating the peas, comprises a liquid supply tank 3, a slightly inclined elongated flume 4, a pump 5 for delivering liquid from the tank 3 into the upper end of the flume 4, and a grid 10 for separating the granules from the liquid at the lower end of the flume 4.

The supply tank 3 is provided with a steam pipe 8 having an adjustable automatic temperature regulator 9 therein, and the end 15 of the pipe 8 disposed near the bottom of the tank 3, is provided with a series of perforations for injecting the steam or other heating medium into the liquid within the tank 3. One end of the tank 3 is provided with a recess 14 with which the pump suction pipe 16 is communicable, and this suction pipe may be connected with the tank at either of three flanges 17 shown in Fig. 2. The pump 5 may also be provided with a connection 18 at the top thereof, which is of value only when relatively hot liquid is being pumped. The discharge pipe 6 of the pump 5 is provided with a regulating valve 7 and communicates with the upper end of the flume 4 through a splash preventing plate 19.

The peas or other granular material may be delivered into the flume 4 either at the upper or any intermediate portion thereof, either from a quality grader or any other treating machine.

The grid 10 which communicates with the lower discharge end of the flume 4 may be provided with fins 11 beneath which a return trough 12 is located. The fins 11 serve to direct the liquid separated from the granular material by the grid 10, into the trough 12, and the trough 12 returns the separated liquid to the supply tank 3. The discharge spout 13 located at the lower end of the grid 10 is adapted to receive the separated granules and to deliver the same to a filling machine or the like.

During normal operation of the hydraulic fluming apparatus while exploiting the improved process, the pump 5 is operating to circulate liquid from the tank 3 through the flume 4. The liquid within the tank 3 is automatically heated to any desired temperature by steam or other heating medium admitted past the regulator 9 and through the pipe 8. When the peas are delivered into the heated liquid flowing down the flume 4 the peas are not only thoroughly washed and simultaneously transported, but they are also subjected to heat sufficient to stop bacterial growth therein. After the peas have been thus treated for a sufficient length of time, they are separated from the transporting liquid and are immediately delivered to a filler or other machine which packs batches of the peas into successive containers in a well known manner. It will be apparent, that with some commodities, the heating may be sufficient to sterilize the product and to thereby kill destructive bacteria, while other products may merely be heated sufficiently to stop bacterial growth.

From the foregoing description it will be apparent that the present invention provides a process of treating edible granular material during the transportation thereof from one machine to another, in order to prevent bacterial growth and activity. The granular material is simultaneously washed and the improved apparatus may be conveniently installed so as to avoid undesirable exposure of the granular material to the atmosphere. The granules are not injured during transportation thereof by the liquid, as the particles directly adjacent to the bottom and to the walls of the flume 4 will travel somewhat slower than the other particles at the center of the stream, thus providing a slow moving lining for the flume and protecting the particles against injury. While it would ordinarily be advantageous to utilize water as a transporting liquid, other liquids may be used, and provision should be made whenever necessary, to occasionally replace the transporting liquid in the system.

It should be understood that it is not desired to limit the invention to the exact details of construction of the apparatus and to the precise steps of the method herein shown and described, for various modifications within the scope of the claims may occur to persons skilled in the art.

It is claimed and desired to secure by Letters Patent:

1. In combination, a tank containing liquid, a gradually inclined unobstructed flume disposed above said tank, a pump for delivering liquid from said tank to the upper end of said flume, the lower end of said flume being laterally widened, an inclined grid having its upper end disposed directly adjacent said widened flume end, and means for returning drainage liquid from said grid to said tank.

2. In combination, a tank containing liquid, a gradually inclined unobstructed flume disposed above said tank and having a laterally widened lower end, a pump for delivering liquid from said tank to the upper end of said flume, said upper flume end being open for the admission of granular material, an inclined grid having its upper end disposed directly adjacent said widened flume end, the bars of said grid having fins depending therefrom, and means for returning drainage liquid from said fins to said tank.

In testimony whereof, I affix my signature.

FRANK D. CHAPMAN.